(12) United States Patent
Yi et al.

(10) Patent No.: US 10,873,937 B2
(45) Date of Patent: *Dec. 22, 2020

(54) METHOD FOR RECONFIGURING A PDCP REORDERING TIMER IN A WIRELESS COMMUNICATION SYSTEM AND DEVICE THEREFOR

(71) Applicant: LG Electronics Inc., Seoul (KR)

(72) Inventors: Seungjune Yi, Seoul (KR); Sunyoung Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/437,982

(22) Filed: Jun. 11, 2019

(65) Prior Publication Data

US 2019/0297610 A1 Sep. 26, 2019

Related U.S. Application Data

(63) Continuation of application No. 15/819,059, filed on Nov. 21, 2017, now Pat. No. 10,334,582, which is a (Continued)

(51) Int. Cl.
*H04W 72/04* (2009.01)
*H04L 1/18* (2006.01)
(Continued)

(52) U.S. Cl.
CPC ......... *H04W 72/042* (2013.01); *H04L 1/1809* (2013.01); *H04L 1/1841* (2013.01);
(Continued)

(58) Field of Classification Search
None
See application file for complete search history.

(56) References Cited

U.S. PATENT DOCUMENTS 10,004,098 B2 * 6/2018 Kim ............... H04L 1/1848
2008/0095116 A1 4/2008 Kim
(Continued)

FOREIGN PATENT DOCUMENTS

CN 101291331 10/2008
CN 201444641 4/2010
(Continued)

OTHER PUBLICATIONS

Chinese Office Action in Chinese Application No. 201580049924.3, dated Dec. 19, 2019, 16 pages (with English translation).
(Continued)

*Primary Examiner* — Otis L Thompson, Jr.
(74) *Attorney, Agent, or Firm* — Fish & Richardson P.C.

(57) ABSTRACT

A method for a User Equipment (UE) operating in a wireless communication system, the method includes receiving an Radio Resource Control (RRC) message for reconfiguring a new value of a Packet Data Convergence Protocol (PDCP) reordering timer, while the PDCP reordering timer is running; and setting a value of reordering_PDCP_RX_COUNT to a COUNT value associated to RX_HFN and Next_PDCP_RX_SN when the RRC message is received.

14 Claims, 15 Drawing Sheets

Related U.S. Application Data continuation of application No. 15/456,935, filed on Mar. 13, 2017, now Pat. No. 9,854,578, which is a continuation of application No. 14/829,192, filed on Aug. 18, 2015, now Pat. No. 9,629,146.

(60) Provisional application No. 62/093,408, filed on Dec. 18, 2014.

(51) Int. Cl.
    *H04W 28/06*     (2009.01)
    *H04W 76/27*     (2018.01)

(52) U.S. Cl.
    CPC .......... *H04L 1/1848* (2013.01); *H04L 1/1851* (2013.01); *H04L 1/1887* (2013.01); *H04L 1/1896* (2013.01); *H04W 28/065* (2013.01); *H04W 76/27* (2018.02)

(56) References Cited

U.S. PATENT DOCUMENTS

| | | | |
|---|---|---|---|
| 2008/0188224 A1* | 8/2008 | Pani | H04W 76/27 455/436 |
| 2009/0016301 A1 | 1/2009 | Sammour et al. | |
| 2009/0034476 A1 | 2/2009 | Wang | |
| 2009/0103478 A1 | 4/2009 | Sammour | |
| 2009/0316664 A1 | 12/2009 | Wu | |
| 2010/0118780 A1 | 5/2010 | Umesh et al. | |
| 2012/0155438 A1 | 6/2012 | Shin et al. | |
| 2013/0064186 A1 | 3/2013 | Wang et al. | |
| 2013/0148490 A1 | 6/2013 | Yi et al. | |
| 2013/0308539 A1 | 11/2013 | Wu | |
| 2014/0071948 A1 | 3/2014 | Kim et al. | |
| 2015/0085800 A1 | 3/2015 | Sivanesan et al. | |
| 2015/0215827 A1 | 7/2015 | Zhang | |
| 2015/0326456 A1 | 11/2015 | Dudda et al. | |
| 2016/0044639 A1 | 2/2016 | Yi et al. | |
| 2016/0050706 A1 | 2/2016 | Zhang | |
| 2016/0234847 A1 | 8/2016 | Zhang et al. | |
| 2016/0302075 A1 | 10/2016 | Dudda et al. | |
| 2016/0315868 A1 | 10/2016 | Zhang et al. | |
| 2016/0338074 A1 | 11/2016 | Chou et al. | |
| 2017/0064679 A1* | 3/2017 | Zhang | H04L 12/28 |
| 2018/0192451 A9* | 7/2018 | Kim | H04W 76/30 |

FOREIGN PATENT DOCUMENTS

| | | |
|---|---|---|
| KR | 1020090116614 | 11/2009 |
| WO | WO2013140138 | 9/2013 |
| WO | WO2014113686 | 7/2014 |

OTHER PUBLICATIONS

LG Electronics Inc., "Introduction to Dual Connectivity in PDCP," 3GPP TSG-RAN WG2 #88, Tdoc R2-145412, Change Request, San Francisco, USA, Nov. 17-21, 2014, pp. 1-27 (Total 28 pages).

Nokia Networks et al., "PDCP Reordering Timer: Value Range and Reconfiguration Handling", 3GPP TSG-RAN WG2 Meeting #88, R2-144920, San Francisco, U.S., Nov. 17-21, 2014, 4 pages.

* cited by examiner (a) Control-Plane Protocol Stack (b) User-Plane Protocol Stack

US 10,873,937 B2

METHOD FOR RECONFIGURING A PDCP REORDERING TIMER IN A WIRELESS COMMUNICATION SYSTEM AND DEVICE THEREFOR

CROSS-REFERENCE TO RELATED APPLICATIONS

This application is a continuation of U.S. application Ser. No. 15/819,059, filed on Nov. 21, 2017, now allowed, which is a continuation of U.S. application Ser. No. 15/456,935, filed on Mar. 13, 2017, now U.S. Pat. No. 9,854,578, which is a continuation of U.S. application Ser. No. 14/829,192, filed on Aug. 18, 2015, now U.S. Pat. No. 9,629,146, which claims the benefit under 35 U.S.C. § 119(e) to U.S. Provisional Application No. 62/093,408, filed on Dec. 18, 2014, all of which are hereby expressly incorporated by reference into the present application.

BACKGROUND OF THE INVENTION

Field of the Invention

The present invention relates to a wireless communication system and, more particularly, to a method for reconfiguring a PDCP reordering timer in wireless communication system and a device therefor.

Discussion of the Related Art

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

SUMMARY OF THE INVENTION

The object of the present invention can be achieved by providing a method for a User Equipment (UE) operating in a wireless communication system, the method comprising: starting a PDCP (Packet Data Convergence Protocol) reordering timer; receiving an RRC (Radio Resource Control) message indicating that a new value is used for the PDCP reordering timer; re-starting the PDCP reordering timer with the new value; and setting a reordering_PDCP_RX_COUNT to a COUNT value associated to RX_HFN and Next_PDCP_RX_SN upon when the PDCP reordering timer with the new value re-starts.

In another aspect of the present invention provided herein is an User Equipment in the wireless communication system, the UE comprising: an RF (radio frequency) module; and a processor configured to control the RF module, wherein the processor is configured to start a PDCP (Packet Data Convergence Protocol) reordering timer, to receive an RRC (Radio Resource Control) message indicating that a new value is used for the PDCP reordering timer, to re-start the PDCP reordering timer with the new value, and to set a reordering_PDCP_RX_COUNT to a COUNT value associated to RX_HFN and Next_PDCP_RX_SN upon when the PDCP reordering timer with the new value re-starts.

Preferably, the reordering_PDCP_RX_COUNT is used only when a PDCP reordering function is used, and, a value of the reordering_PDCP_RX_COUNT is a value of a COUNT following a COUNT value associated with a PDCP PDU (Protocol Data Unit) which triggered a PDCP reordering timer.

Preferably, a variable of the RX_HFN indicates a HFN (Hyper Frame Number) value for generation of a COUNT value used for a received PDCP PDUs for a PDCP entity.

Preferably, a variable of the Next_PDCP_RX_SN indicates a next expected PDCP SN (Sequence Number) by a receiver for a PDCP entity.

Preferably, the setting the reordering_PDCP_RX_COUNT to the COUNT value associated to RX_HFN and Next_PDCP_RX_SN corresponds to re-starting the PDCP reordering timer with new value for a PDCP SDU (Service Data Unit) with a highest COUNT value among PDCP SDUs stored in a reordering buffer.

Preferably, when the RRC is received, while the PDCP reordering timer is running, the running PDCP reordering timer is stopped.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

DETAILED DESCRIPTION OF THE EMBODIMENTS

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
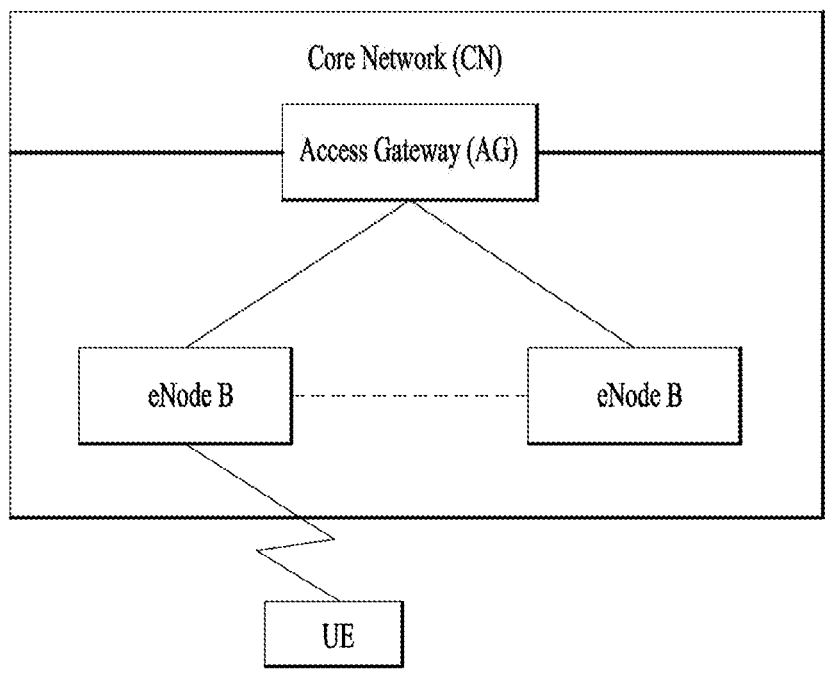
FIG. 1 is a diagram showing a network structure of an Evolved Universal Mobile Telecommunications System (E-UMTS) as an example of a wireless communication system.
Figure 2A:
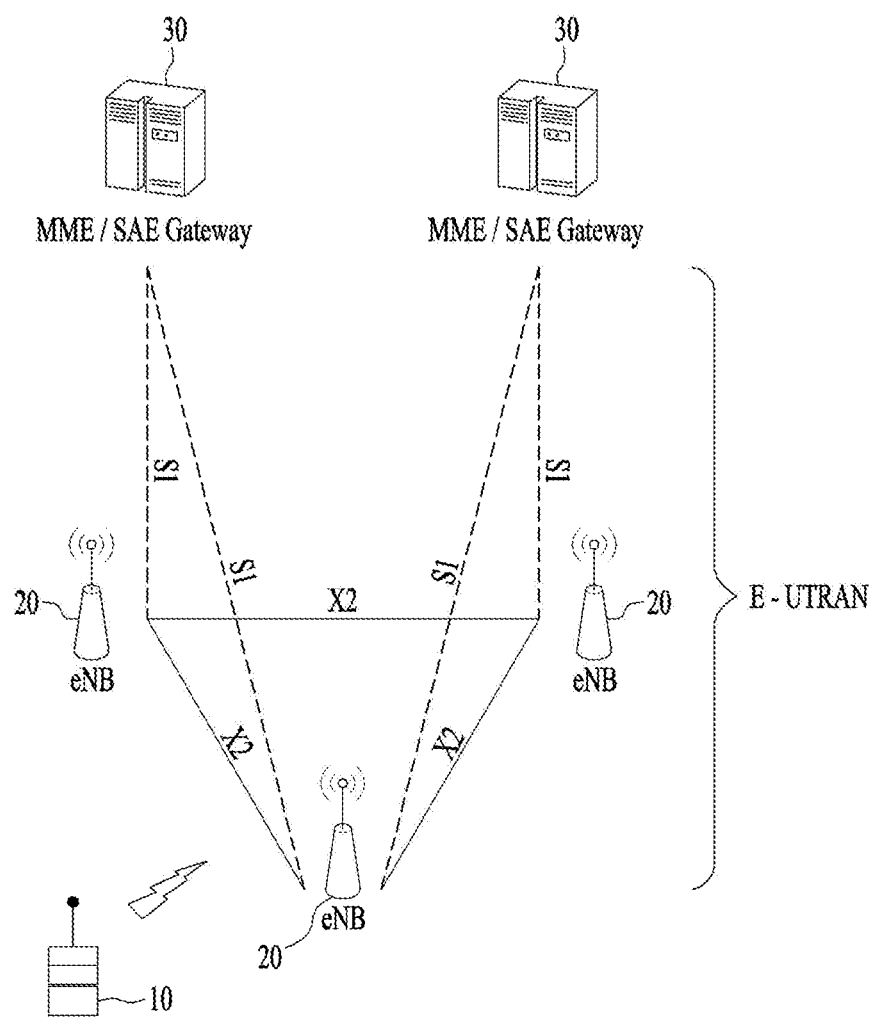
FIG. 2A is a block diagram illustrating network structure of an evolved universal mobile telecommunication system (E-UMTS)

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2B:
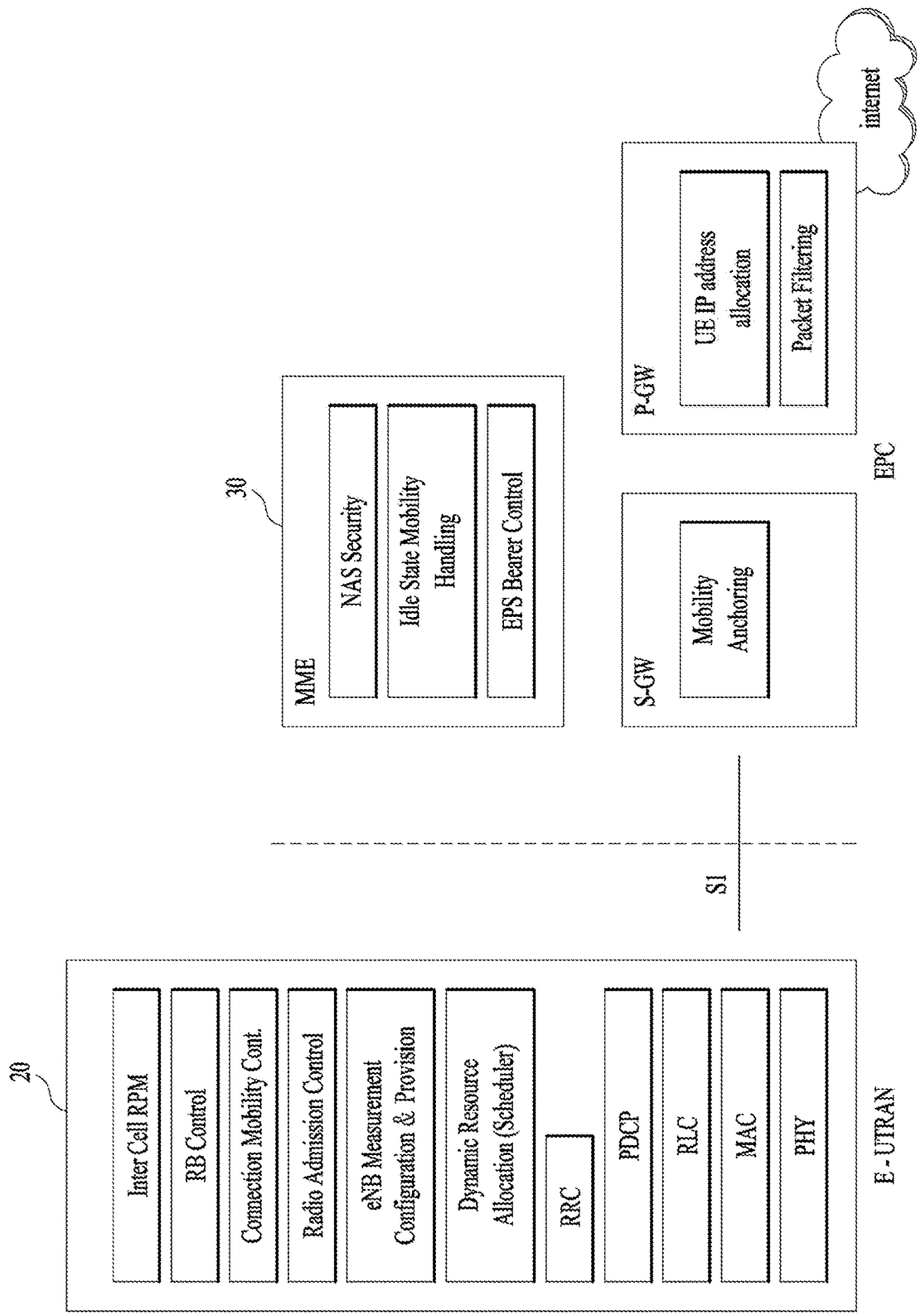
FIG. 2B is a block diagram depicting architecture of a typical E-UTRAN and a typical EPC.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3:
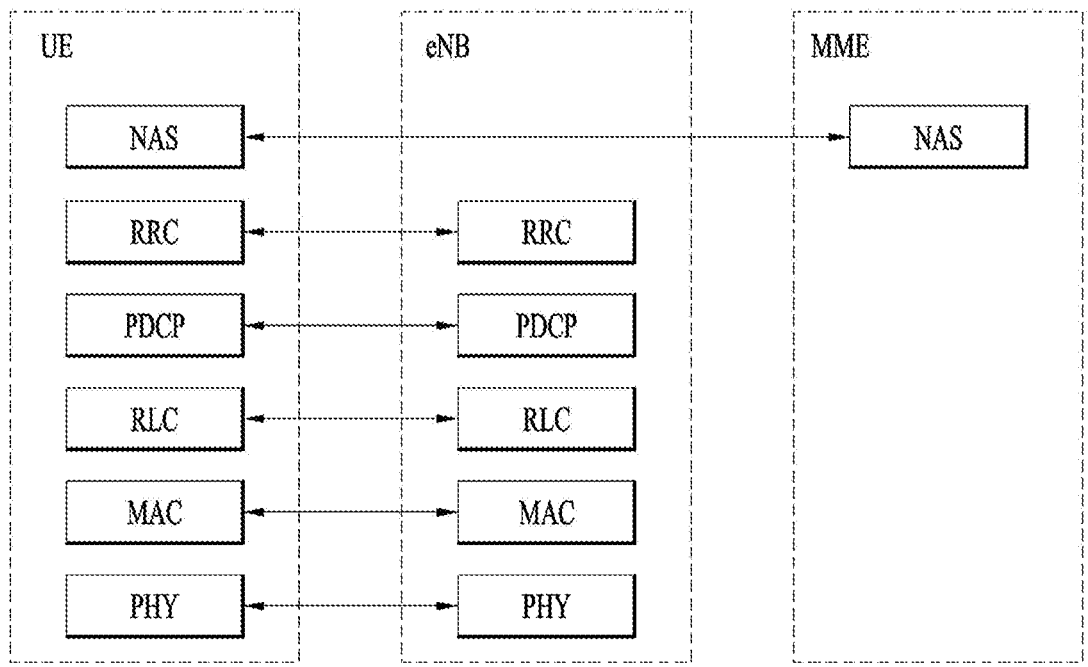
FIG. 3 is a diagram showing a control plane and a user plane of a radio interface protocol between a UE and an E-UTRAN based on a 3rd generation partnership project (3GPP) radio access network standard.
Figure 3:
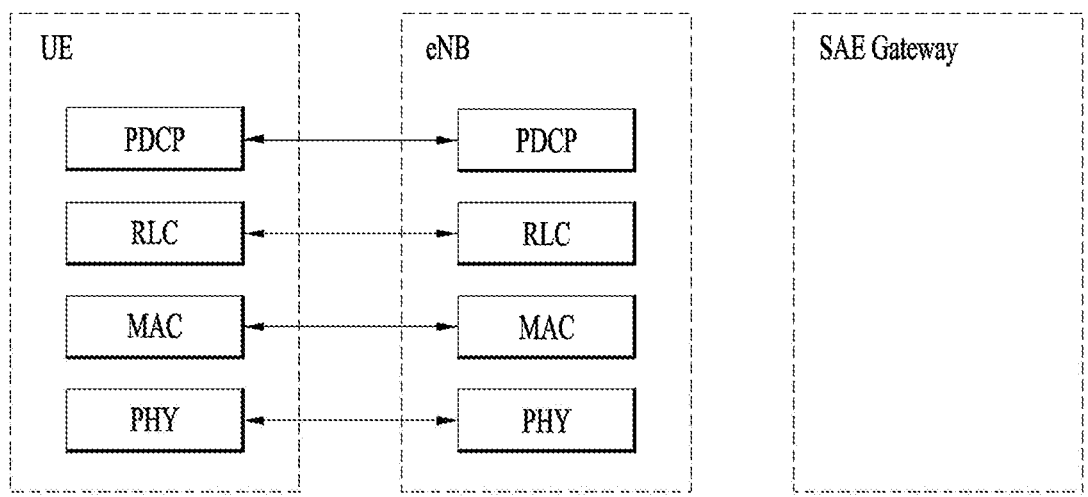

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
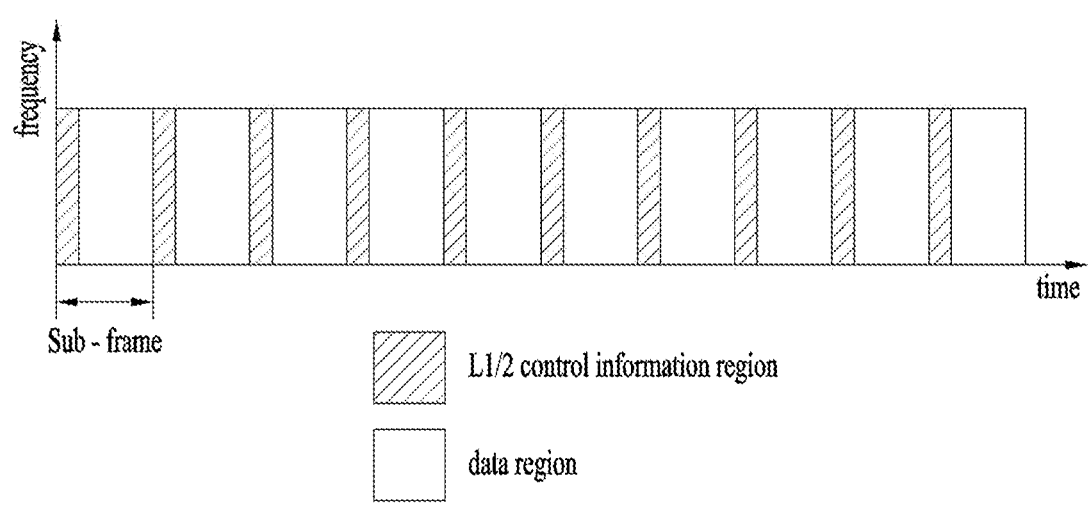
FIG. 4 is a diagram of an example physical channel structure used in an E-UMTS system.

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Figure 5:
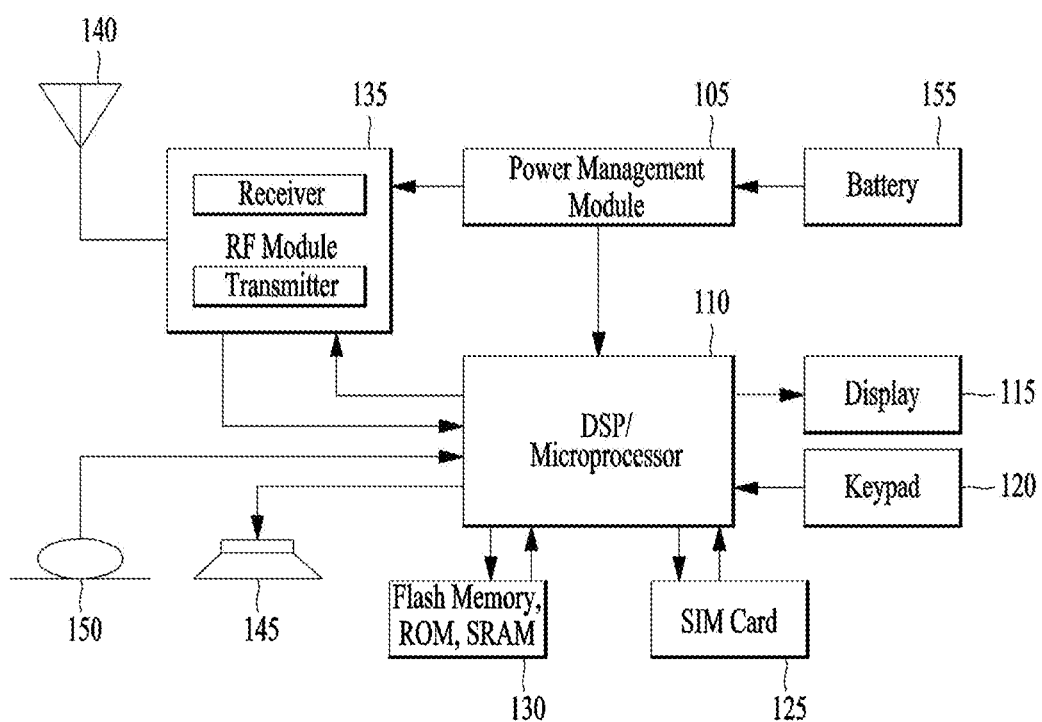
FIG. 5 is a block diagram of a communication apparatus according to an embodiment of the present invention

FIG. 5 is a block diagram of a communication apparatus according to an embodiment of the present invention.

The apparatus shown in FIG. 5 can be a user equipment (UE) and/or eNB adapted to perform the above mechanism, but it can be any apparatus for performing the same operation.

As shown in FIG. 5, the apparatus may comprise a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 5 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 5 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

Figure 6:
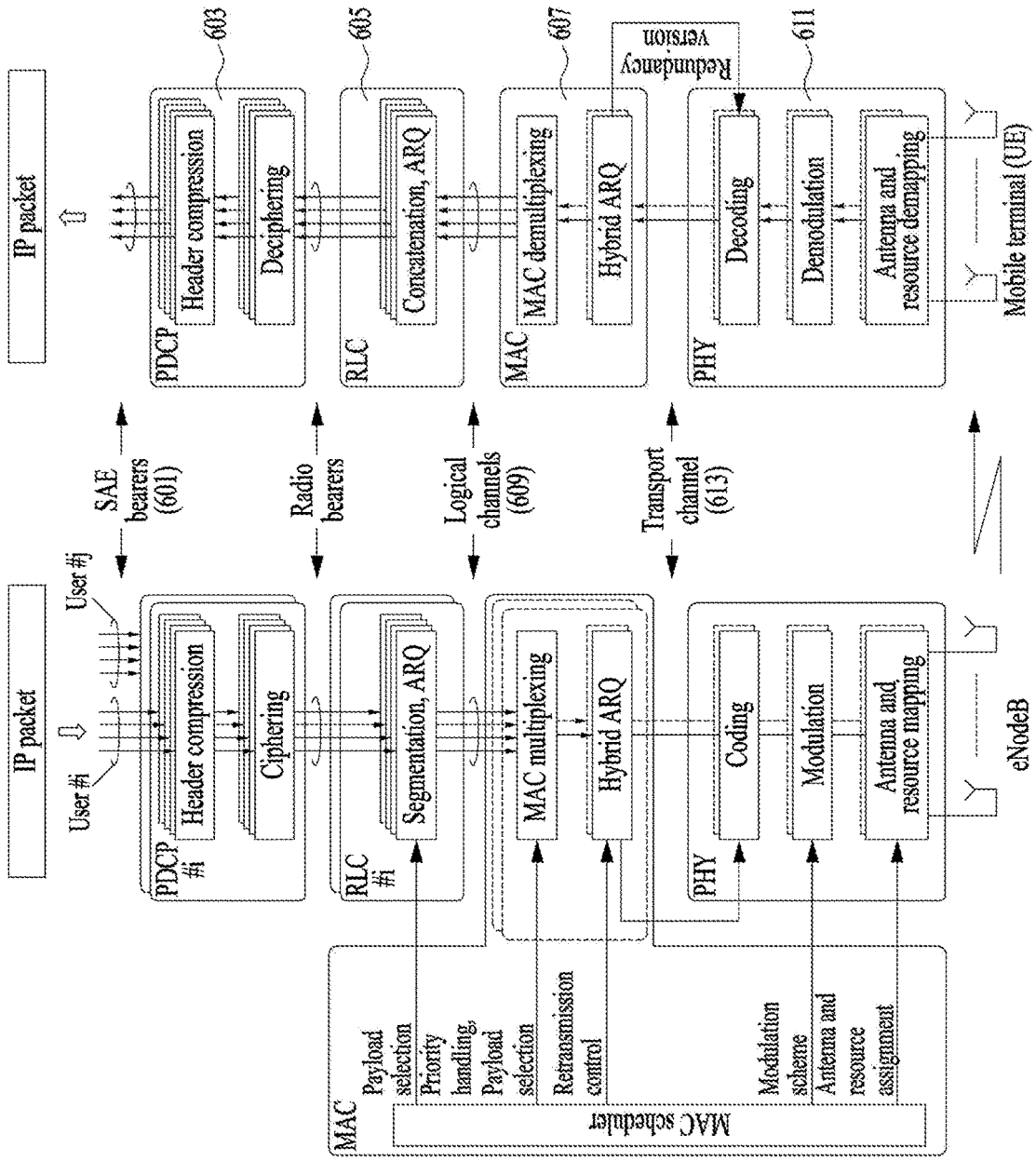
FIG. 6 is a diagram for a general overview of the LTE protocol architecture for the downlink.

FIG. 6 is a diagram for a general overview of the LTE protocol architecture for the downlink.

A general overview of the LTE protocol architecture for the downlink is illustrated in FIG. 6. Furthermore, the LTE protocol structure related to uplink transmissions is similar to the downlink structure in FIG. 6, although there are differences with respect to transport format selection and multi-antenna transmission.

Data to be transmitted in the downlink enters in the form of IP packets on one of the SAE bearers (601). Prior to transmission over the radio interface, incoming IP packets are passed through multiple protocol entities, summarized below and described in more detail in the following sections:

Packet Data Convergence Protocol (PDCP, 603) performs IP header compression to reduce the number of bits necessary to transmit over the radio interface. The header-compression mechanism is based on ROHC, a standardized header-compression algorithm used in WCDMA as well as several other mobile-communication standards. PDCP (603) is also responsible for ciphering and integrity protection of the transmitted data. At the receiver side, the PDCP protocol performs the corresponding deciphering and decompression operations. There is one PDCP entity per radio bearer configured for a mobile terminal.

Radio Link Control (RLC, 605) is responsible for segmentation/concatenation, retransmission handling, and in-sequence delivery to higher layers. Unlike WCDMA, the RLC protocol is located in the eNodeB since there is only a single type of node in the LTE radio-access-network architecture. The RLC (605) offers services to the PDCP (603) in the form of radio bearers. There is one RLC entity per radio bearer configured for a terminal.

There is one RLC entity per logical channel configured for a terminal, where each RLC entity is responsible for: i) segmentation, concatenation, and reassembly of RLC SDUs; ii) RLC retransmission; and iii) in-sequence delivery and duplicate detection for the corresponding logical channel.

Other noteworthy features of the RLC are: (1) the handling of varying PDU sizes; and (2) the possibility for close interaction between the hybrid-ARQ and RLC protocols. Finally, the fact that there is one RLC entity per logical channel and one hybrid-ARQ entity per component carrier implies that one RLC entity may interact with multiple hybrid-ARQ entities in the case of carrier aggregation.

The purpose of the segmentation and concatenation mechanism is to generate RLC PDUs of appropriate size from the incoming RLC SDUs. One possibility would be to define a fixed PDU size, a size that would result in a compromise. If the size were too large, it would not be possible to support the lowest data rates. Also, excessive padding would be required in some scenarios. A single small PDU size, however, would result in a high overhead from the header included with each PDU. To avoid these drawbacks, which is especially important given the very large dynamic range of data rates supported by LTE, the RLC PDU size varies dynamically.

In process of segmentation and concatenation of RLC SDUs into RLC PDUs, a header includes, among other fields, a sequence number, which is used by the reordering and retransmission mechanisms. The reassembly function at the receiver side performs the reverse operation to reassemble the SDUs from the received PDUs.

Medium Access Control (MAC, 607) handles hybrid-ARQ retransmissions and uplink and downlink scheduling. The scheduling functionality is located in the eNodeB, which has one MAC entity per cell, for both uplink and downlink. The hybrid-ARQ protocol part is present in both the transmitting and receiving end of the MAC protocol. The MAC (607) offers services to the RLC (605) in the form of logical channels (609).

Physical Layer (PHY, 611), handles coding/decoding, modulation/demodulation, multi-antenna mapping, and other typical physical layer functions. The physical layer (611) offers services to the MAC layer (607) in the form of transport channels (613).

Figure 7:
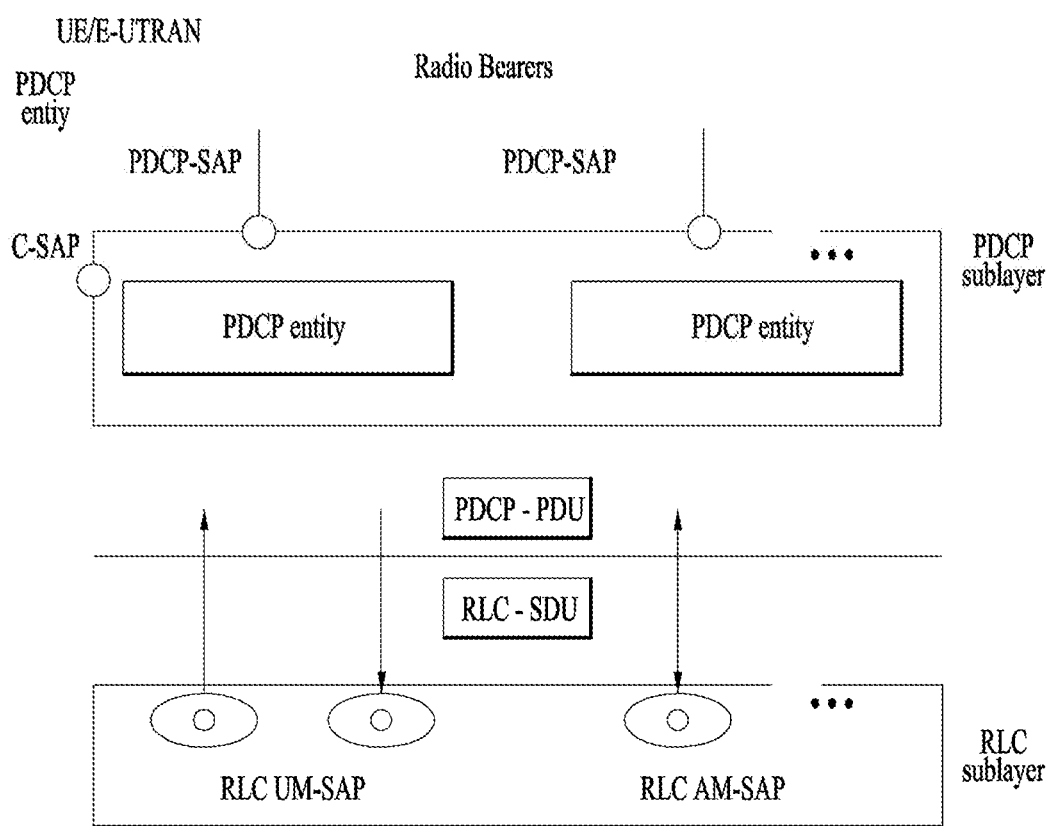
FIG. 7 is a conceptual diagram for a PDCP entity architecture.

FIG. 7 is a conceptual diagram for a PDCP entity architecture.

FIG. 7 represents one possible structure for the PDCP sublayer, but it should not restrict implementation. Each RB (i.e. DRB and SRB, except for SRB0) is associated with one PDCP entity. Each PDCP entity is associated with one or two (one for each direction) RLC entities depending on the RB characteristic (i.e. uni-directional or bi-directional) and RLC mode. The PDCP entities are located in the PDCP sublayer. The PDCP sublayer is configured by upper layers.

Figure 8:
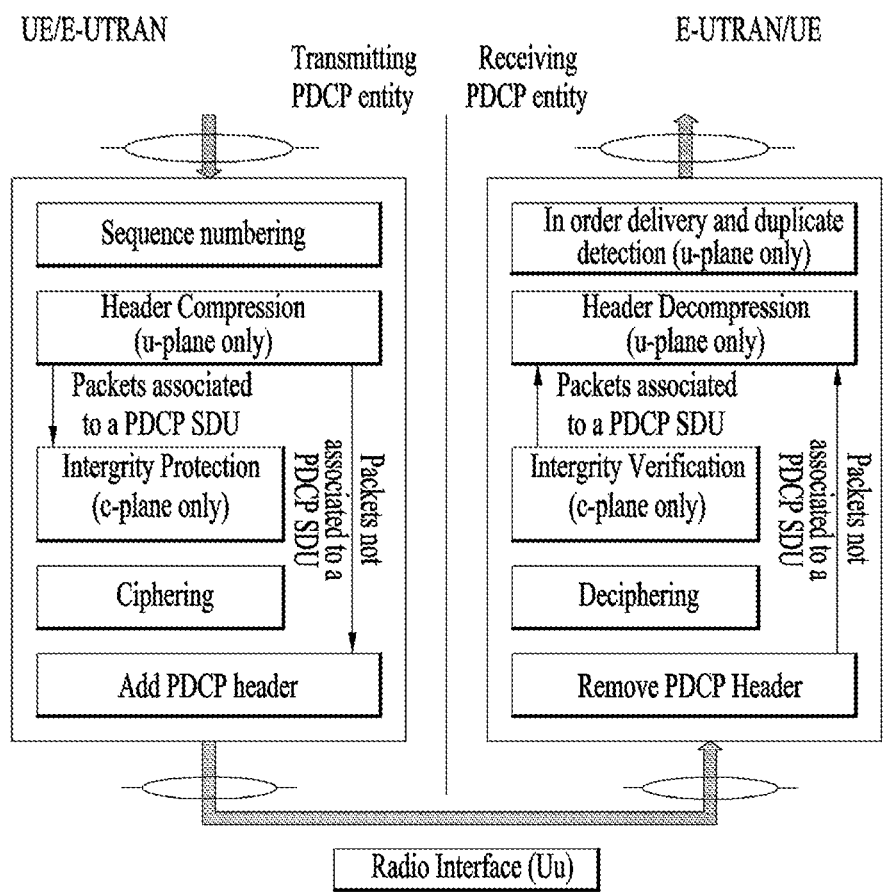
FIG. 8 is a conceptual diagram for functional view of a PDCP entity.

FIG. 8 is a conceptual diagram for functional view of a PDCP entity.

The PDCP entities are located in the PDCP sublayer. Several PDCP entities may be defined for a UE. Each PDCP entity carrying user plane data may be configured to use header compression. Each PDCP entity is carrying the data of one radio bearer. In this version of the specification, only the robust header compression protocol (ROHC), is supported. Every PDCP entity uses at most one ROHC compressor instance and at most one ROHC decompressor instance. A PDCP entity is associated either to the control plane or the user plane depending on which radio bearer it is carrying data for.

FIG. 8 represents the functional view of the PDCP entity for the PDCP sublayer, it should not restrict implementation.

The paper describes variety of state variables used in PDCP entities in order to specify the PDCP protocol. All state variables are non-negative integers.

The transmitting side of each PDCP entity shall maintain the following state variables:

a) Next_PDCP_TX_SN: the variable Next_PDCP_TX_SN indicates the PDCP SN of the next PDCP SDU for a given PDCP entity. At establishment of the PDCP entity, the UE shall set Next_PDCP_TX_SN to 0.

b) TX_HFN: the variable TX_HFN indicates the HFN value for the generation of the COUNT value used for PDCP PDUs for a given PDCP entity. At establishment of the PDCP entity, the UE shall set TX_HFN to 0.

The receiving side of each PDCP entity shall maintain the following state variables:

a) Next_PDCP_RX_SN: the variable Next_PDCP_RX_SN indicates the next expected PDCP SN by the receiver for a given PDCP entity. At establishment of the PDCP entity, the UE shall set_Next_PDCP_RX_SN to 0.

b) RX_HFN: the variable RX_HFN indicates the HFN value for the generation of the COUNT value used for the received PDCP PDUs for a given PDCP entity. At establishment of the PDCP entity, the UE shall set RX_HFN to 0.

c) Last_Submitted_PDCP_RX_SN: for PDCP entities for DRBs mapped on RLC AM the variable Last_Submitted_PDCP_RX_SN indicates the SN of the last PDCP SDU delivered to the upper layers. At establishment of the PDCP entity, the UE shall set Last_Submitted_PDCP_RX_SN to Maximum_PDCP_SN.

d) Reordering_PDCP_RX_COUNT: this variable is used only when the reordering function is used. This variable holds the value of the COUNT following the COUNT value associated with the PDCP PDU which triggered reordering-Timer.

e) Reordering_Window: Reordering window indicates size of the reordering window. The size equals to 2048 when a 12 bit SN length is used, or 16384 when a 15 bit SN length is used, i.e. half of the PDCP SN space, for radio bearers that are mapped on RLC AM.

f) Maximum_PDCP_SN is: i) 32767 if the PDCP entity is configured for the use of 15 bits SNs, ii) 4095 if the PDCP entity is configured for the use of 12 bit SNs, iii) 127 if the PDCP entity is configured for the use of 7 bit SNs, or iv) 31 if the PDCP entity is configured for the use of 5 bit SNs.

In case of UL data transfer procedures, in the PDCP entity, at reception of a PDCP SDU from upper layers, the UE may start a discard timer associated with the PDCP SDU. For a PDCP SDU received from upper layers, the UE may associate a PDCP SN (Sequence Number) corresponding to Next_PDCP_TX_SN to the PDCP SDU, perform header compression of the PDCP SDU, perform integrity protection and ciphering using COUNT based on TX_HFN and the PDCP SN associated with this PDCP SDU, increment the Next_PDCP_TX_SN by one, and submit the resulting PDCP Data PDU to lower layer.

If the Next_PDCP_TX_SN is greater than Maximum_PDCP_SN, the Next_PDCP_TX_SN is set to '0' and TX_HFN is incremented by one.

In case of DL data transfer procedures, for DRBs mapped on RLC AM, the PDCP entity use a reordering function when the PDCP entity is associated with two AM RLC entities, or the PDCP entity is associated with one AM RLC entity after it was, according to the most recent reconfiguration, associated with two AM RLC entities without performing PDCP re-establishment.

For DRBs mapped on RLC AM, when the reordering function is used, at reception of a PDCP Data PDU from lower layers, the UE discards the PDCP PDU if received PDCP SN-Last_Submitted_PDCP_RX_SN>Reordering_Window or 0≤Last_Submitted_PDCP_RX_SN-received PDCP SN<Reordering_Window.

Else if Next_PDCP_RX_SN-received PDCP SN>Reordering_Window, the UE increments RX_HFN by one, uses COUNT based on RX_HFN and the received PDCP SN for deciphering the PDCP PDU, and sets Next_PDCP_RX_SN to the received PDCP SN+1.

Else if received PDCP SN-Next_PDCP_RX_SN≥Reordering_Window, the UE uses COUNT based on RX_HFN-1 and the received PDCP SN for deciphering the PDCP PDU.

Else if received PDCP SN≥Next_PDCP_RX_SN, the UE uses COUNT based on RX_HFN and the received PDCP SN for deciphering the PDCP PDU, and sets Next_PDCP_RX_SN to the received PDCP SN+1, and if Next_PDCP_RX_SN is larger than Maximum_PDCP_SN, the UE sets Next_PDCP_RX_SN to 0 and increments RX_HFN by one.

Else if received PDCP SN<Next_PDCP_RX_SN, the UE uses COUNT based on RX_HFN and the received PDCP SN for deciphering the PDCP PDU.

If the PDCP PDU has not been discarded in the above, and a PDCP SDU with the same PDCP SN is stored, the UE discards the PDCP PDU. If a PDCP SDU with the same PDCP SN is not, stored, the UE performs deciphering of the PDCP PDU and store the resulting PDCPS DU.

If received PDCP SN=Last_Submitted_PDCP_RX_SN+1 or received PDCP SN=Last_Submitted_PDCP_RX_SN-Maximum_PDCP_SN, the UE delivers to upper layers in ascending order of the associated COUNT value. All stored PDCP SDUs with consecutively associated COUNT values starting from the COUNT value associated with the received PDCP PDU.

And the UE sets Last_Submitted_PDCP_RX_SN to the PDCP SN of the last PDCP SDU delivered to upper layers.

If a reorderingTimer is running and the PDCP SDU with Reordering_PDCP_RX_COUNT-1 has been delivered to upper layers, the UE stops and resets the reorderingTimer.

If reorderingTimer is not running and there is at least one stored PDCP SDU, the UE starts reorderingTimer and sets Reordering_PDCP_RX_COUNT to the COUNT value associated to RX_HFN and Next_PDCP_RX_SN.

When the reorderingTimer expires, the UE delivers to upper layers in ascending order of the associated COUNT value. All stored PDCP SDUs with associated COUNT values less than Reordering_PDCP_RX_COUNT, and all stored PDCP SDUs with consecutively associated COUNT values starting from Reordering_PDCP_RX_COUNT.

And the UE sets Last_Submitted_PDCP_RX_SN to the PDCP SN of the last PDCP SDU delivered to upper layers.

If there is at least one stored PDCP SDU, the UE starts reorderingTimer, and set Reordering_PDCP_RX_COUNT to the COUNT value associated to RX_HFN and Next_PDCP_RX_SN.

FIG. 9 is PDCP data PDU and a PDCP control PDU.

A PDCP PDU is a bit string that is byte aligned (i.e. multiple of 8 bits) in length. Bit strings are represented by tables in which the most significant bit is the leftmost bit of the first line of the table, the least significant bit is the rightmost bit on the last line of the table, and more generally the bit string is to be read from left to right and then in the reading order of the lines. The bit order of each parameter field within a PDCP PDU is represented with the first and most significant bit in the leftmost bit and the last and least significant bit in the rightmost bit.

PDCP SDUs are bit strings that are byte aligned (i.e. multiple of 8 bits) in length. A compressed or uncompressed SDU is included into a PDCP PDU from the first bit onward.

The PDCP data PDU is used to convey: i) a PDCP SDU SN, ii) user plane data containing an uncompressed PDCP SDU, iii) user plane data containing a compressed PDCP SDU, iv) control plane data, or v) a MAC-I field for SRBs.

The PDCP control PDU is used to convey: i) a PDCP status report indicating which PDCP SDUs are missing and which are not following a PDCP re-establishment, and ii) header compression control information, e.g. interspersed ROHC feedback.

Figure 9A:
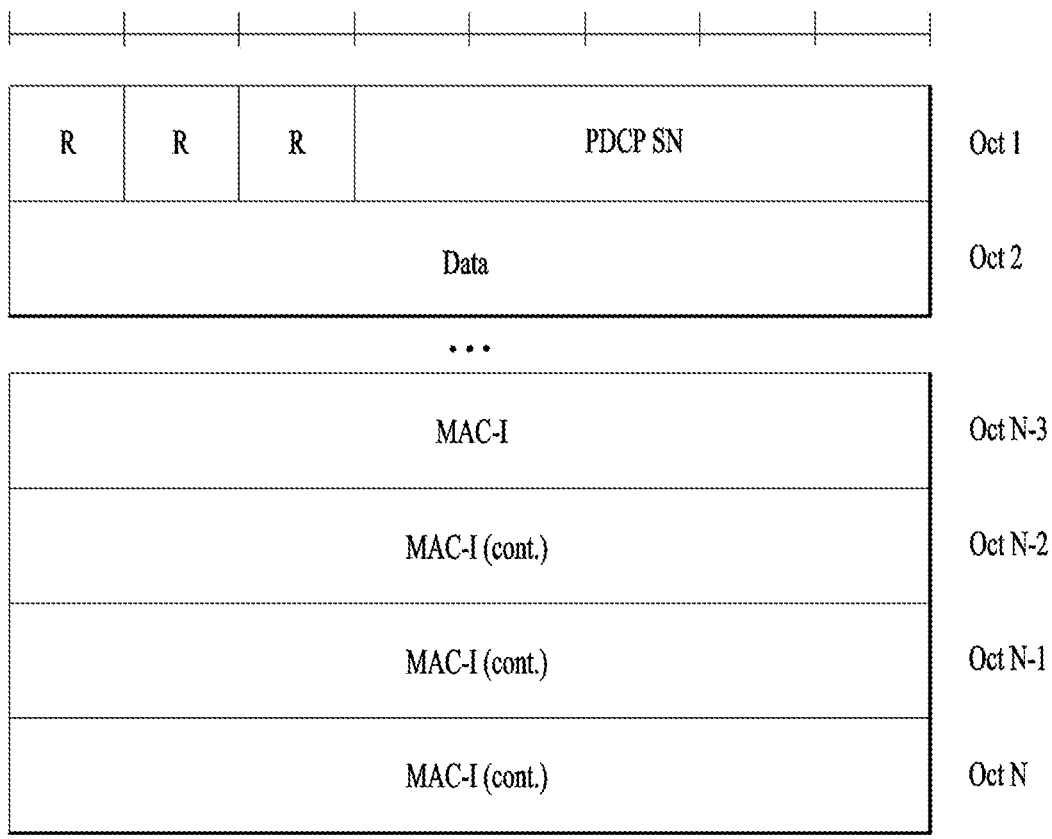
FIG. 9A is a format of the PDCP Data PDU carrying data for control plane SRBs.
Figure 9B:
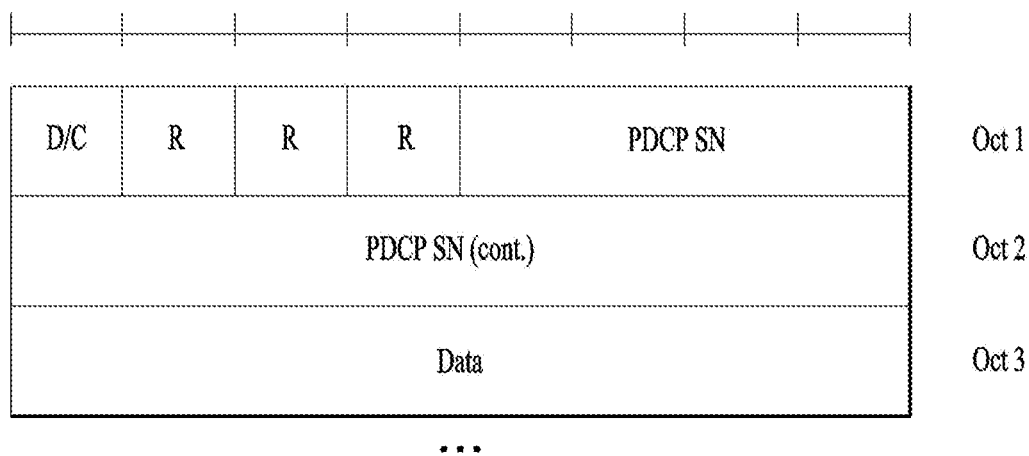
FIG. 9B is a format of the PDCP Data PDU when a 12 bit SN length is used.
Figure 9C:
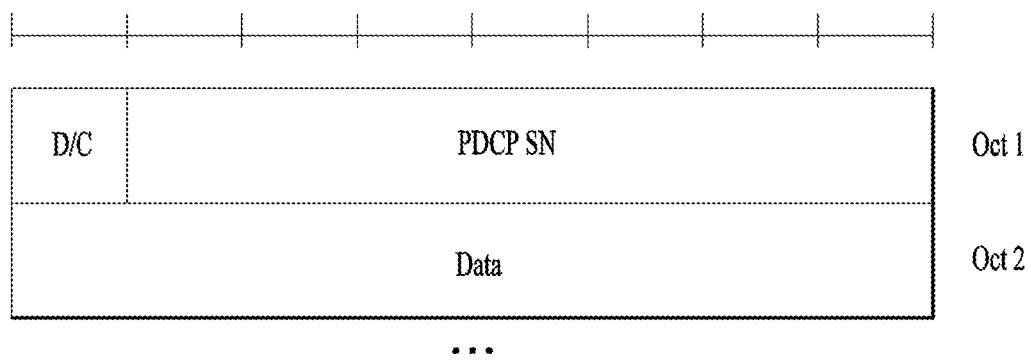
FIG. 9C is a format of the PDCP Data PDU when a 7 bit SN length is used.
Figure 9D:
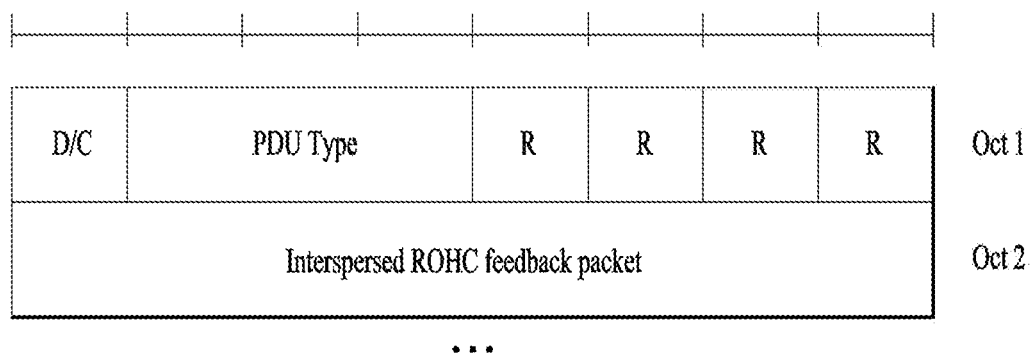
FIG. 9D is a format of the PDCP Control PDU carrying one interspersed ROHC feedback packet.
Figure 9E:
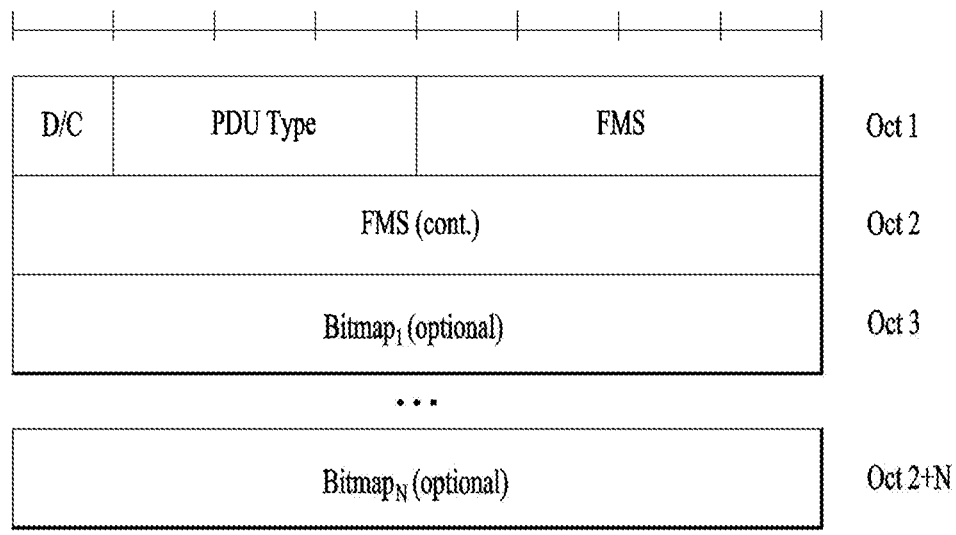
FIG. 9E is format of the PDCP Control PDU carrying one PDCP status report when a 12 bit SN length is used.
Figure 9F:
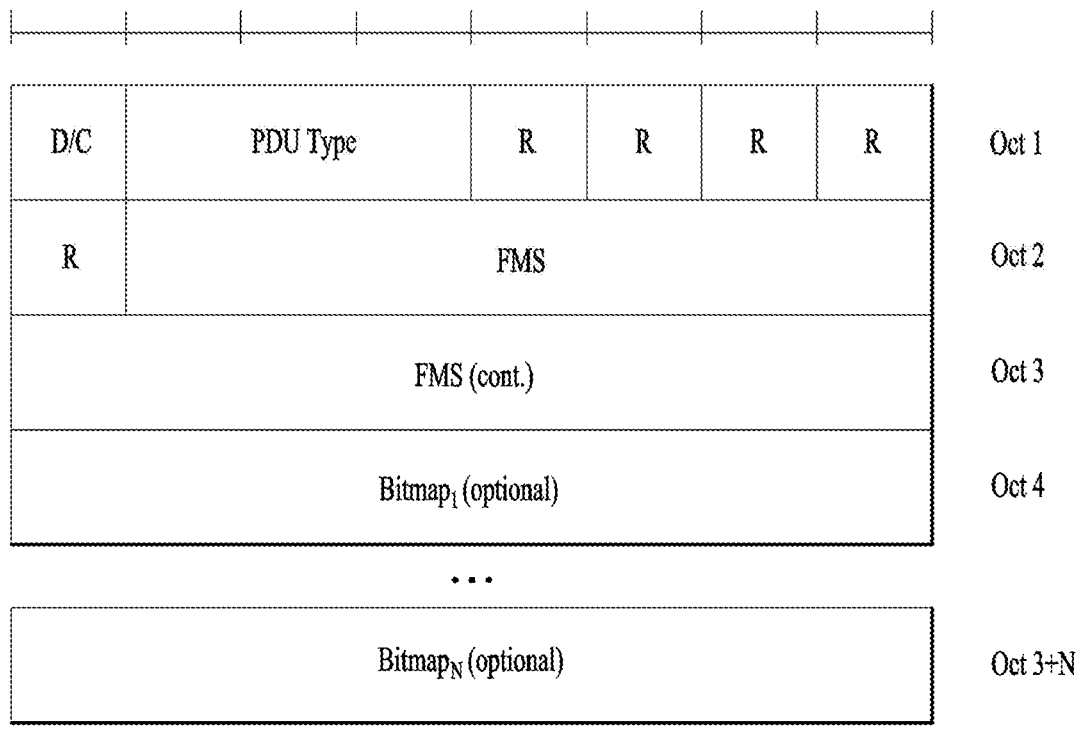
FIG. 9F is a format of the PDCP Control PDU carrying one PDCP status report when a 15 bit SN length is used.

FIG. 9A is a format of the PDCP Data PDU carrying data for control plane SRBs, FIG. 9B is a format of the PDCP Data PDU when a 12 bit SN length is used. This format is applicable for PDCP Data PDUs carrying data from DRBs mapped on RLC AM or RLC UM. FIG. 9C is a format of the PDCP Data PDU when a 7 bit SN length is used. This format is applicable for PDCP Data PDUs carrying data from DRBs mapped on RLC UM. FIG. 9D is a format of the PDCP Control PDU carrying one interspersed ROHC feedback packet. This format is applicable for DRBs mapped on RLC AM or RLC UM. FIG. 9E is format of the PDCP Control PDU carrying one PDCP status report when a 12 bit SN length is used, and FIG. 9F shows a format of the PDCP Control PDU carrying one PDCP status report when a 15 bit SN length is used. This format is applicable for DRBs mapped on RLC AM.

The bits in parameters used in FIGS. 9A to 9F can be interpreted as follows. The left most bit string is the first and most significant and the right most bit is the last and least significant bit. Unless otherwise mentioned, integers are encoded in standard binary encoding for unsigned integers.

a) PDCP SN: length of the PDCP SN is 5, 7, 12, or 15 bits as indicated in Table 1.

TABLE 1

| Length | Description |
| --- | --- |
| 5 | SRBs |
| 7 | DRBs, if configured by upper layers (pdcp-SN-Size [3]) |
| 12 | DRBs, if configured by upper layers (pdcp-SN-Size [3]) |
| 15 | DRBs, if configured by upper layers (pdcp-SN-Size [3]) | b) Data: Data field includes uncompressed PDCP SDU (user plane data, or control plane data) or compressed PDCP SDU (user plane data only.

c) MAC-I: length of MAC-I is 32 bits. The MAC-I field carries a message authentication code calculated. For control plane data that are not integrity protected, the MAC-I field is still present and should be padded with padding bits set to 0.

d) COUNT: length of COUNT is 32 bits. For ciphering and integrity a COUNT value is maintained. The COUNT value is composed of a HFN and the PDCP SN. The length of the PDCP SN is configured by upper layers. The size of the HFN part in bits is equal to 32 minus the length of the PDCP SN.

e) R: length of R is 1 bit. The is bit is reserved bit set to 0. Reserved bits shall be ignored by the receiver.

f) D/C: length of D/C is 1 bit. Table 2 represents meaning of D/C field.

TABLE 2

| Bit | Description |
| --- | --- |
| 0 | Control PDU |
| 1 | Data PDU | g) PDU type: length of PDU type is 3 bits. Table 3 represents meaning of PDU type.

TABLE 3

| Bit | Description |
| --- | --- |
| 000 | PDCP status report |
| 001 | Interspersed ROHC feedback packet |
| 010-111 | reserved | h) FMS: length of FMS is 12 bits when a 12 bit SN length is used, or length of FMS is 15 bits when a 15 bit SN length is used. PDCP SN of the first missing PDCP SDU.

i) Bitmap: length of the bitmap field can be 0. The MSB of the first octet of the type "Bitmap" indicates whether or not the PDCP SDU with the SN (FMS+1) modulo (Maximum_PDCP_SN+1) has been received and, optionally decompressed correctly.

The LSB of the first octet of the type "Bitmap" indicates whether or not the PDCP SDU with the SN (FMS+8) modulo (Maximum_PDCP_SN+1) has been received and, optionally decompressed correctly.

j) Interspersed ROHC feedback packet: Contains one ROHC packet with only feedback, i.e. a ROHC packet that is not associated with a PDCP SDU.

The PDCP reordering timer is used to detect loss of PDCP PDUs. Only one reorderingTimer per PDCP entity is running at a given time.

Figure 10:
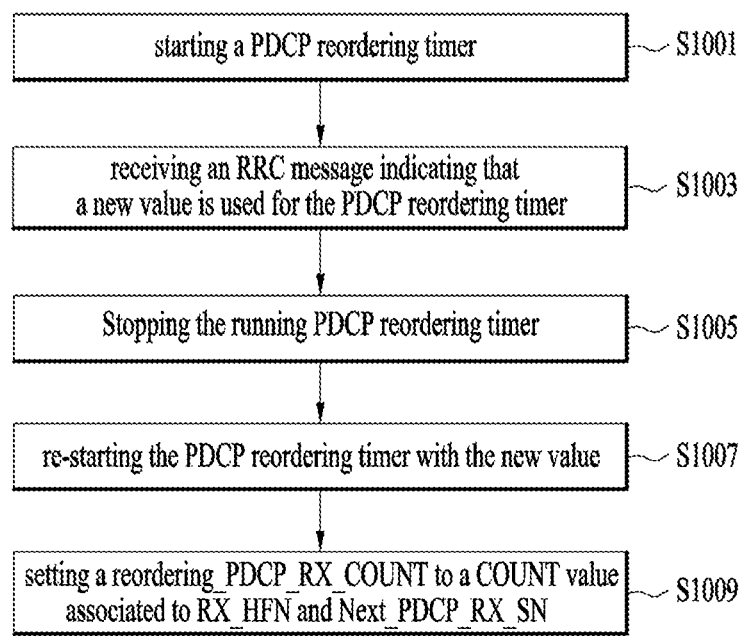
FIG. 10 is a diagram for reconfiguring a PDCP reordering timer according to embodiments of the present invention.

FIG. 10 is a diagram for reconfiguring a PDCP reordering timer according to embodiments of the present invention.

In the previous art, when a PDCP SDU with Reordering_PDCP_RX_COUNT-1 has been delivered to upper layers, if the reorderingTimer is not running and there is at least one stored PDCP SDU, the UE starts the reorderingTimer.

At that time, if the eNB informs the UE of a new value of the PDCP reordering timer in order to reconfigure a value of the PDCP reordering timer configured in the UE, the UE has to stop the running timer and restart the reordering timer.

In this case, in order to avoid reordering delay, a new mechanism is needed that re-configures the reordering timer with a new value when the UE receives an RRC message indicating that a new value is used for the PDCP reordering timer.

In this invention, when the UE receives an RRC message indicating that a new value is used for the PDCP reordering timer, the UE stops the PDCP reordering timer if it is currently running, and starts the timer with the new value for the PDCP SDU with the highest COUNT value among the PDCP SDUs stored in the reordering buffer.

The UE may start a PDCP reordering timer due to out of sequence of PDCP SDUs (S1001). When the UE receives an RRC message indicating that a new value is used for the PDCP reordering timer (S1003), the UE stops the running PDCP reordering timer (S1005), and re-starts the PDCP reordering timer with the new value indicated by the RRC message (S1007). And the UE sets a reordering_PDCP_RX_COUNT to a COUNT value associated to RX_HFN and Next_PDCP_RX_SN upon when the PDCP reordering timer with the new value re-starts (S1009).

The step of setting the reordering_PDCP_RX_COUNT to the COUNT value associated to RX_HFN and Next_PDCP_RX_SN corresponds to re-starting the PDCP reordering timer with new value for a PDCP SDU with a highest COUNT value among PDCP SDUs stored in a reordering buffer.

Figure 11:
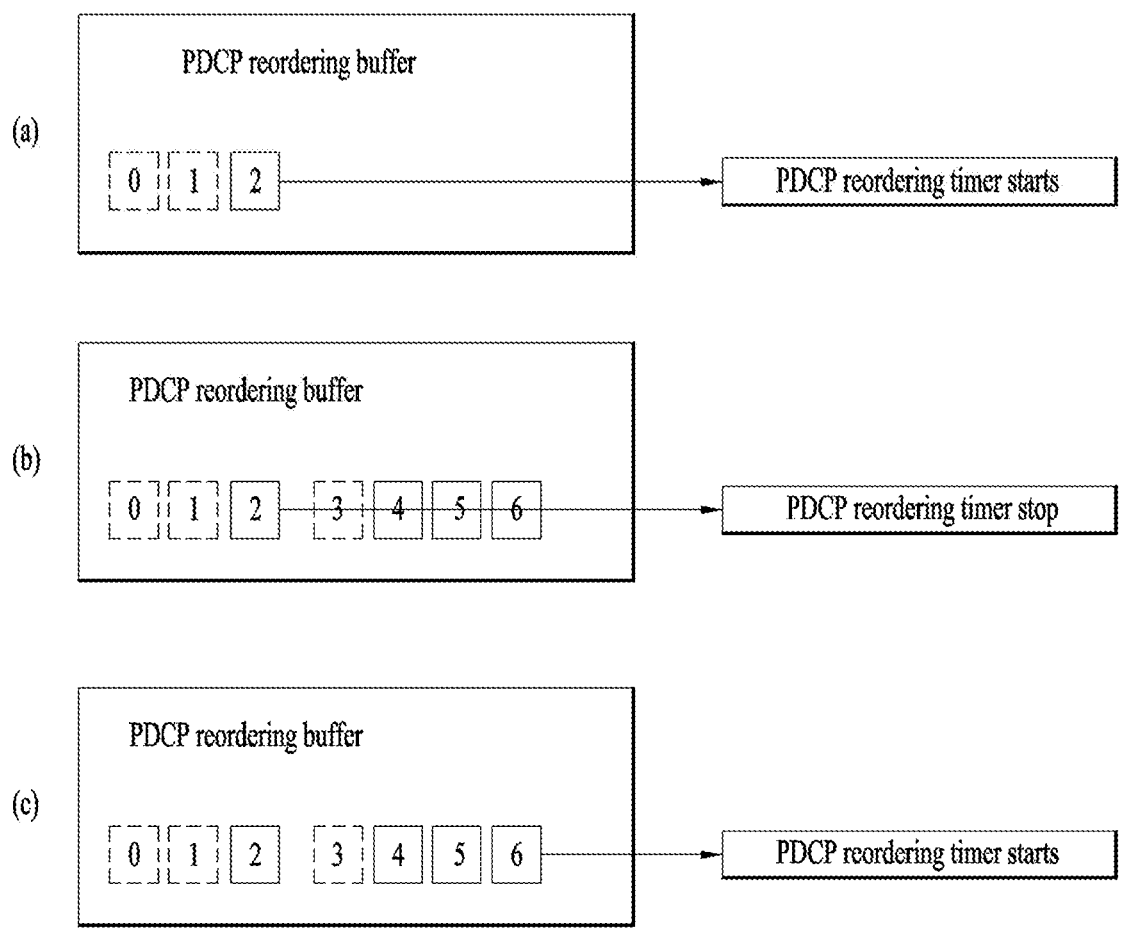
FIG. 11 is an example for reconfiguring a PDCP reordering timer according to embodiments of the present invention.

FIG. 11 is an example for reconfiguring a PDCP reordering timer according to embodiments of the present invention.

When the UE receives PDCP SDU with a COUNT value=2, if there is not any PDCP SDUs other than the PDCP SDU with a COUNT value=2 in the reordering buffer, the UE starts a PDCP reordering timer for PDCP SDU with a COUNT value=2 (a). While the PDCP reordering timer for PDCP SDU with a COUNT value=2 is running, other PDCP SDUs with COUNT values=4, 5, 6, respectively are received. In this time, when the UE receives RRC signal that a new value is used for the PDCP reordering timer in order to reconfigure the PDCP reordering timer, the UE stops the PDCP reordering timer for PDCP SDU with a COUNT value=2 (b), and re-starts the PDCP reordering timer with new value for a PDCP SDU with a highest COUNT value among PDCP SDUs stored in a reordering buffer. In this case, the UE may re-start the PDCP reordering timer with new value for a PDCP SDU with a COUNT value=6 (c). It means that the UE may set a reordering_PDCP_RX_COUNT to a COUNT value associated to RX_HFN and Next_PDCP_RX_SN.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. An apparatus configured to perform wireless communications, the apparatus comprising:
   a memory; and
   at least one processor coupled to the memory and configured to:
   start a reordering timer,
   receive a Radio Resource Control (RRC) message including a value for the reordering timer,
   set a value of a first status variable associated with the reordering timer to a value of a second status variable indicating a first COUNT value of a next data unit expected to be received in a buffer related to the reordering timer, and
   stop and restart the reordering timer, based on the reordering timer being reconfigured to the value included in the RRC message while the reordering timer is running.

2. The apparatus according to claim 1, wherein the reordering timer is restarted with the value included in the RRC message.

3. The apparatus according to claim 1, wherein the first COUNT value is composed of HFN (Hyper Frame Number) and a PDCP SN (Sequence Number).

4. The apparatus according to claim 1, wherein based on an out-of-order Protocol Data Unit (PDU) with a second COUNT value being received from a lower layer, the reordering timer is started.

5. The apparatus according to claim 4, wherein based on the out-of-order PDU with the second COUNT value being received from the lower layer, the second status variable is updated to the second COUNT value+1.

6. The apparatus according to claim 1, wherein the first status variable is a value of a COUNT following a COUNT value associated with a Protocol Data Unit (PDU) which triggered the reordering timer.

7. The apparatus according to claim 1, wherein the reordering timer is configured to a Packet Data Convergence Protocol (PDCP) entity.

8. A method performed by an apparatus for wireless communications, the method comprising:
   starting a reordering timer,
   receiving a Radio Resource Control (RRC) message including a value for the reordering timer,
   setting a value of a first status variable associated with the reordering timer to a value of a second status variable indicating a first COUNT value of a next data unit expected to be received in a buffer related to the reordering timer, and stopping and restarting the reordering timer, based on the reordering timer being reconfigured to the value included in the RRC message while the reordering timer is running.

9. The method according to claim 8, wherein the reordering timer is restarted with the value included in the RRC message.

10. The method according to claim 8, wherein the first COUNT value is composed of HFN (Hyper Frame Number) and a PDCP SN (Sequence Number).

11. The method according to claim 8, wherein based on an out-of-order Protocol Data Unit (PDU) with a second COUNT value being received from a lower layer, the reordering timer is started.

12. The method according to claim 11, wherein based on the out-of-order PDU with the second COUNT value being received from the lower layer, the second status variable is updated to the second COUNT value+1.

13. The method according to claim 8, wherein the first status variable is a value of a COUNT following a COUNT value associated with a Protocol Data Unit (PDU) which triggered the reordering timer.

14. The method according to claim 8, wherein the reordering timer is configured to a Packet Data Convergence Protocol (PDCP) entity.

* * * * *